United States Patent [19]
Choi et al.

[11] Patent Number: 5,427,326
[45] Date of Patent: Jun. 27, 1995

[54] TAPE REWINDING DEVICE FOR MAGNETIC RECORDING AND REPRODUCING APPARATUS

[75] Inventors: Do Y. Choi; Young H. Cho; Gun C. Park, all of Suweon-city, Rep. of Korea

[73] Assignee: Samsung Electronics Co., Ltd., Kyungki-do, Rep. of Korea

[21] Appl. No.: 93,400

[22] Filed: Aug. 4, 1993

[30] Foreign Application Priority Data

Aug. 4, 1992 [KR] Rep. of Korea ............... 92-14600
Jul. 30, 1993 [KR] Rep. of Korea ............... 93-14667

[51] Int. Cl.$^6$ ............................................. G11B 15/43
[52] U.S. Cl. ............................................. 242/338
[58] Field of Search ............... 242/338, 339, 349, 356, 242/335; 360/74.3, 96.1, 96.3

[56] References Cited

U.S. PATENT DOCUMENTS

| | | | |
|---|---|---|---|
| 4,214,283 | 7/1980 | Fushimi | 242/338 X |
| 5,140,475 | 8/1992 | Tanaka | 360/96.1 X |
| 5,150,265 | 9/1992 | Tanaka | 242/338 X |

*Primary Examiner*—John P. Darling
*Attorney, Agent, or Firm*—Sughrue, Mion, Zinn, Macpeak & Seas

[57] ABSTRACT

A tape rewinding device for a magnetic recording and reproducing apparatus. When a tape cassette is loaded and recorded or reproduced, the tape often becomes loose within the deck. The tape rewinding device automatically recovers the loose portion of the tape during the ejecting of the tape cassette. A slider is provided with a tape recovering apparatus that includes a plurality of gears, and the tape recovering means is meshed with a rack gear. During the ejecting of the tape cassette, the gears are made to revolve by being meshed with the rack gear, and the rotating gear rotates a supply reel, thereby rewinding the loosen tape.

8 Claims, 11 Drawing Sheets

TAPE REWINDING DEVICE FOR MAGNETIC RECORDING AND REPRODUCING APPARATUS

FIELD OF THE INVENTION

The present invention relates to a tape rewinding device for a magnetic recording and reproducing apparatus, in which, when a tape is ejected from the deck, the reel having the tape is made to revolve, so that a proper tension should be maintained on the tape between the drum and the reel, thereby preventing a damage of the tape.

BACKGROUND OF THE INVENTION

Magnetic recording and reproducing apparatuses such as video tape recorders have been developed in diversified patterns for a long time, and, at present, they can be found in every hone. That is, they are felt as if they are necessary goods, and the demands for them are still increasing.

The magnetic recording and reproducing apparatuses which are currently used at homes are mostly based on VHS (video home system) using a ½-inch tape cassette. Such a magnetic recording and reproducing apparatus includes: a cassette holder for receiving a tape cassette; driving members for pulling the cassette holder into the apparatus to place it on a main deck; a means for loading or unloading the magnetic tape of the tape cassette to and from a rotating drum installed on the main deck; and a means for guiding the magnetic tape along a certain path.

Thus, if the tape cassette is inserted into the cassette holder, this insertion state is sensed, and the tape cassette is placed on the main deck. In this state, the magnetic tape is loaded into the fast rotating drum by pole bases, so that signals can be recorded on the magnetic tape or the signals recorded on the magnetic tape can be reproduced.

Recently, video cameras which utilize the magnetic recording and reproducing apparatus are becoming compact and light weight for the convenience of users. Conforming to this trend, video cameras using the existing 8 mm tape cassette are widely known.

One of the most important factors for the miniaturization and light weight of the product is the size of the deck. That is, the compactness and light weightness of the product are decided, according as how much the size of the deck is reduced. Therefore, the degree of the reduction of the deck size is the measure of the technical level, for which magnetic recording and reproducing apparatuses of various types based on various methods are being developed.

Japanese Patent Application Laid-Open No. 61-211863 discloses a recording and reproducing apparatus which includes: a supply reel and a take-up reel; a driving board having a capstan and pinch rollers; a drum board having a rotating drum; guide means for guiding the driving board and the drum board in a sliding manner; a tape loading means for passing the tape around the rotating drum during the sliding of the driving board and the drum board; and a pinch roller accessing means for accessing the pinch roller to the capstan, thereby making the size of the deck compact and light weight. This recording and reproducing apparatus uses the 8 mm tape cassette, in which the hubs of the supply reel and the take-up reel are fixed, thereby contributing to the miniaturization of the deck size to a certain degree. However, there is a limitation in reducing the size of the deck.

In an attempt to reduce the deck size to the maximum and to simplify the components, the present inventors disclosed a magnetic recording and reproducing apparatus in their Korean Patent Application No. 93-5016. According to this apparatus, during the loading of the tape cassette, the hubs of the tape cassette are pivoted around certain axes, and the rotating drum is completely received into the tape cassette, thereby miniaturizing the size of the deck to the maximum degree. This apparatus will be briefly described below.

Referring to FIG. 1, an eject lever 10 is integrally formed with a pair of backwardly extended arms 12, and the arms 12 are connected through shafts 16 to a pair of brackets 14 which are uprightly provided within the body of the apparatus (not shown). Thus, the eject lever 10 opens and closes up and down itself around the shafts 16. A locking pin 17 is provided on the front of the eject lever 10, and when performing an ejecting operation, the locking pin 17 is released so that the eject lever 10 should be exposed to the outside of the apparatus with a certain angle, thereby making it possible to insert or eject a tape cassette 20 to and from the apparatus.

A pin 18 is formed on a side of the arm 12 of the eject lever 10, and this pin 18 is inserted into an elongated slot 34 of a bracket 32 which is uprightly provided on a side of an upper chassis 30, so that the upper chassis 30 can vertically move up and down during the pivoting of the elect lever 10 up and down.

Above the upper chassis 30, there is installed a slider 40 for moving the tape cassette 20 in the horizontal direction forwardly and backwardly. A cassette holder 50 is connected through a shaft 42 to the end of the slider 40, and a projection 54 is extended by a pin 43 to be inserted into an elongated slot 41 of the slider 40.

Thus, the cassette holder 50 can be pivoted around a shaft 51, so that the tape cassette 20 can be inserted or ejected.

At a side of the cassette holder 50, there is installed a lead opening member 52 which pivots up and down around a shaft 51, and which is provided with an elongated slot 53 at approximately the middle portion thereof, so that a pin 54 of the cassette holder 50 can be fitted into the slot 53 to guide the member 52.

The middle portion of the lead opening member 52 is connected to the slider 40 by a link 44 which is inclined with a certain angle, while the link 42 is connected with the link 44 through an elastic member 45. Therefore, when the cassette holder 50 is settled on the slider 40, the lead opening member 52 is pivoted around the shaft 51, so that a lead 22 of the tape cassette 20 can be opened.

Meanwhile, reel bases 46 and 47 are installed on the slider 40, and reels 48 and 49 are installed on the reel bases 46 and 47, so that the hubs (not shown) of the tape cassette can be guided. The slider 40 is movable forwardly and backwardly in the horizontal direction by a slider moving mechanism (not shown) which is installed on the upper chassis 30.

Below the upper chassis 30, there is installed a lower chassis 60 on which respective running components for driving the magnetic tape (not shown) within the tape cassette 20 are installed.

At the sides of the upper chassis 30 and the lower chassis 60, there are installed a pair of links 61 and 62 based on the principle of the Scott Russell link mechanism in a mutually crossing form, which are connected through a pair of end pins 63 to the lower chassis 60, while an elastic member 65 is installed to a central pin 64 of the links 61 and 62. Owing to the scissors-like movements of the links 61 and 62, the upper chassis 30 can vertically move up and down.

In such a conventional magnetic recording and reproducing apparatus constituted as above, if the tape cassette 20 is inserted into the partly exposed cassette holder 50, and if the cassette holder 50 is closed by pressing it, then the cassette holder 50 pivots around the shaft 52 to be settled on the slider 40.

Then, the hubs of the tape cassette 20 are guided by the reels 48 and 49 which are installed on the slider 40. The lead opening member 52 which is provided at a side of the cassette holder 50 pivots clockwise around the shaft 51, so that the lead 22 of the tape cassette 20 should be opened.

Under this condition, if the slider 40 is pushed toward the upper chassis 30, then the slider moving mechanism (not shown) which is installed on the upper chassis 30 horizontally moves the slider 40 toward the upper chassis 30, thereby completing the movement of the slider 40 relative to the upper chassis 30.

However, as shown in FIG. 2A, if a user pushes the slider 40 toward the rotating drum 36 in a state with the tape cassette 20 settled on the slider 40, then the slider 40 moves from above the upper chassis 30 to the rotating drum 36 as described above. Under this condition, the magnetic tape 24 within the tape cassette 20 contacts with the rotating drum 36, and released from the hub 26 of the tape cassette 20, so that a state as shown in FIG. 2B is maintained.

Under the state of FIG. 2B, if the user closes the eject lever 10 by pressing it, the locking pin 17 which is formed at the front thereof is locked to the locking member (not shown) which is formed on the lower chassis 60. During the descending of the eject lever 10, the pin 18 which is provided on a side of the eject lever 10 moves along the elongated slot 34 which is formed on the bracket 32 of the upper chassis 30, with the result that the upper chassis 30 comes down to above the lower chassis 60. At the same time, a tape loading means (not shown) loads the magnetic tape 24 to the rotating drum, thereby making it possible to carry out a reproducing operation for the magnetic tape 24.

After the completion of such a reproducing operation, if the user opens up the eject lever 10 of FIG. 1 from the lower chassis 60, the upper chassis 30 ascends from the lower chassis 60, such ascending being carried out by the links 61 and 62 and the elastic member 65.

In case that the upper chassis 30 rises from the lower chassis 60 by being separated, the magnetic tape 24 which has been loaded on the rotating drum 36 is automatically wound by a tape unloading means (not shown).

Thus when the upper chassis 30 has been completely risen from the lower chassis 60, the magnetic tape 24 is maintained in the state shown in FIG. 2B.

Thereafter, if the user pulls the slider to separate the upper chassis 30 with the rotating drum 36 installed thereon, the slider 40 is made to elastically move in the horizontal direction by a slider moving mechanism (not shown), with the result that the upper chassis 30 and the slider 40 are maintained in a state shown in FIG. 2A.

However, in such a magnetic recording and reproducing apparatus, after the completion of the reproducing operation, in the case where the slider 40 reversely moves from the upper chassis 30 after the upper chassis 30 moves from the lower chassis 60, the magnetic tape 24 is extended as much as closely contacted to the rotating drum 36 as shown in FIG. 2C. Therefore, during the ejecting of the tape cassette, the extended portion of the magnetic tape 24 can be entangled to the lead 22 or to the various components of the deck, thereby damaging the magnetic tape.

SUMMARY OF THE INVENTION

The present invention is intended to overcome the above described disadvantages of the conventional techniques.

Therefore it is the object of the present invention to provide a tape rewinding device for a magnetic recording and reproducing apparatus, in which, when ejecting a tape cassette from the deck, the already extended tape portion is automatically wound to the hub of the cassette, thereby preventing the damage to the magnetic tape.

In achieving the above object, a first embodiment of the present invention includes: a main chassis having a rotating drum; a pair of reels for installing a tape cassette; and a sub-chassis for sliding over the main chassis toward the rotating drum to load or unload the tape cassette. The first embodiment of the present invention further includes: a rack gear formed on the main chassis; and a tape recovering means for being meshed with the rack gear to generate rotating force during the unloading of the tape cassette by the moving sub-chassis, and for transmitting the rotating force to one of the pair of the reels to recover the tape portion loaded around the rotating drum during the ejecting of the tape cassette.

According to the first embodiment of the present invention, the tape recovering means consists of a plurality of idler gears for generating the rotating force by being meshed with the rack gear, and the shafts of the idler gears are installed on the sub-chassis.

According to the first embodiment of the present invention, the tape recovering means is rotatably installed on the sub-chassis, and includes: a first gear meshed with the rack gear; a second gear meshed with the first gear; a third gear meshed with the second gear, and meshed with the reel during the sliding of the sub-chassis for unloading the tape cassette, so as for the extended portion of the tape to be wound on the reel; and a pivoting member fixed on the shaft of the first gear for the meshes of the first, second and third gears.

Further, the third gear of the tape recovering means should be preferably provided with a slipping member in order to prevent the loosening of the tape.

A second embodiment of the present invention includes: a main chassis having a rotating drum; and a sub-chassis with a pair of reels installed thereon for installing the tape cassette, and for sliding over the main chassis toward the rotating drum to load or unload the tape cassette. The second embodiment of the present invention further includes: a rack gear installed on the main chassis: a transmitting gear connected to one of the two reels for transmitting the rotating force; and a tape recovering means meshed with the rack gear to generate a rotating force during the unloading of the tape cassette through the movement of the sub-chassis, and for transmitting the rotating force to the transmitting gear to drive the reel, thereby recovering the tape portion loaded around the rotating drum.

According to the second embodiment of the present invention, the tape recovering means preferably includes: an idler gear for being rotatable by being meshed with the rack gear; and an idler position regulating means for regulating the position of the idler gear to release the transmitting gear upon the completion of the loading of the tape cassette through the sliding of the sub-chassis.

According to the second embodiment of the present invention, the tape recovering means preferably includes: a transmitting gear installed on the reel base, and for being meshed with the reel to rotate it; a first idler gear for being meshed with the transmitting gear to rotate forwardly or reversely during the loading or unloading of the tape cassette, and for being not meshed with the transmitting gear upon completion of loading of the tape cassette by the sub-chassis; and a second idler gear for being meshed with the rack gear and the first idler gear by the pivoting member to rotate the first idler gear.

The first idler gear is meshed with the transmitting gear during the time when the sub-chassis loads or unloads the tape cassette, but the first idler gear is meshed with the transmitting gear only when the sub-chassis has completed to load the tape cassette. In this manner, the first idler gear is regulated by the idler position regulating means which is provided at the end of the reel base.

BRIEF DESCRIPTION OF THE DRAWINGS

The above object and other advantages of the present invention will become more apparent by describing in detail the preferred embodiments of the present invention with reference to the attached drawings in which.

DESCRIPTION OF THE PREFERRED EMBODIMENT

Figure 3A:
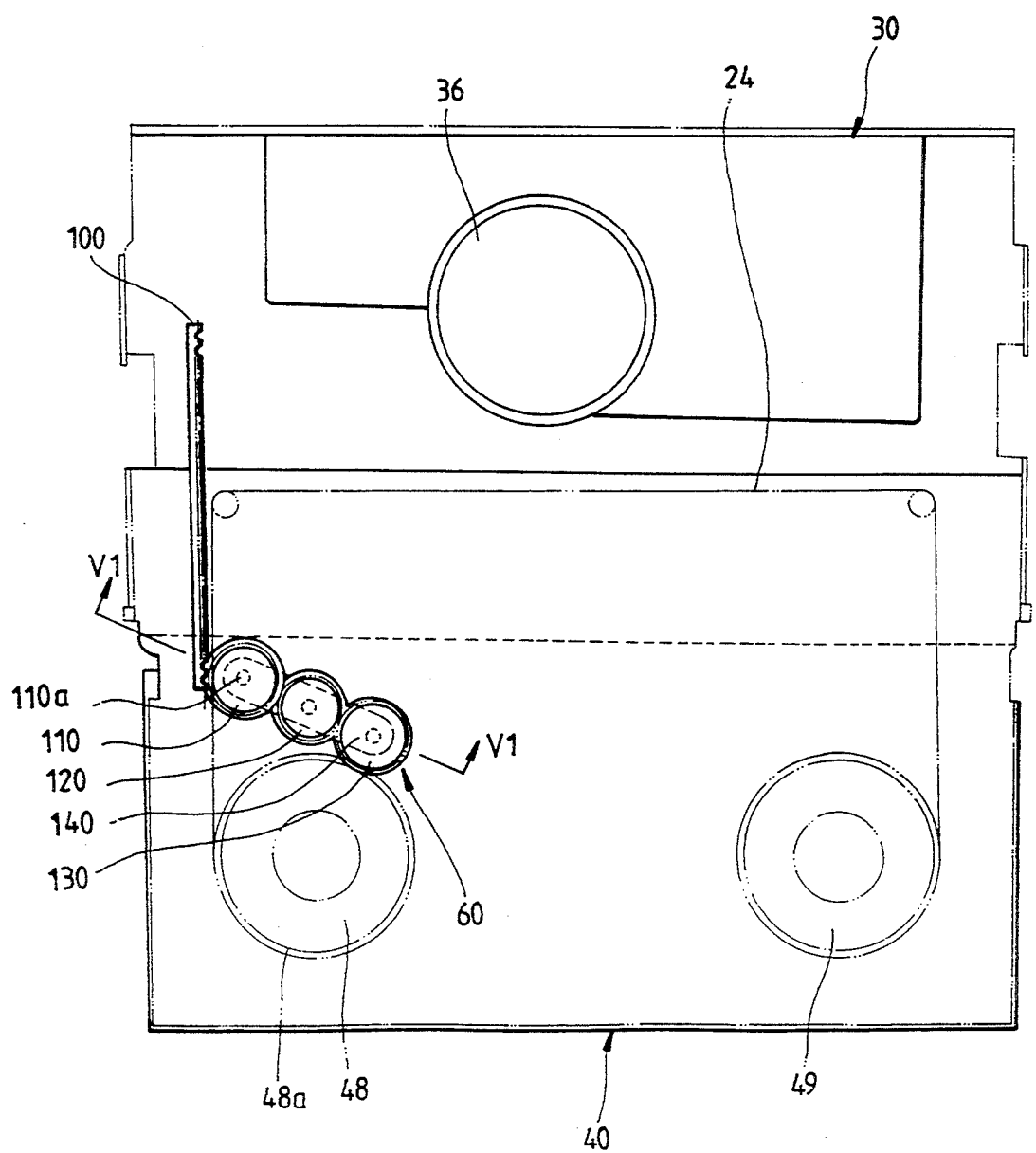
FIG. 3A is a schematic plan view of the magnetic recording and reproducing apparatus having the tape rewinding device according to the first embodiment of the present invention, in which the slider is settled on the upper chassis initially.
Figure 3B:
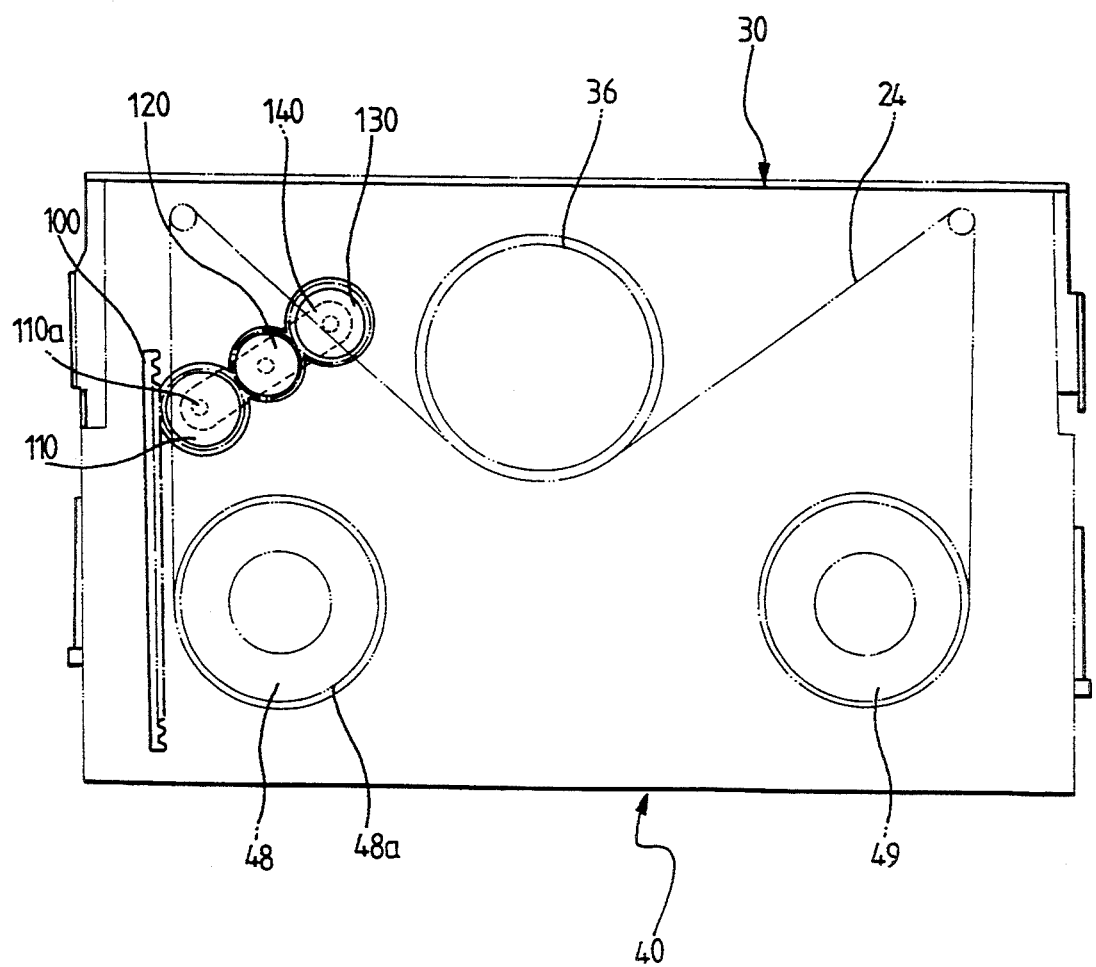
FIG. 3B is a schematic plan view of the tape recovering means showing a state in which the slider is moved horizontally forwardly toward the rotating drum under the state of FIG. 3A.

FIGS. 3A and 3B are schematic plan views of a tape recorder in which the tape rewinding device of the present invention is applicable, and showing a condition in which a slider 40 moves over an upper chassis 30. In these drawings, the necessarily required components are shown in solid lines, while others are shown in imaginary lines. Therefore, these drawings are for illustrating the technical details in a clear form, and not for limiting the scope of the present invention.

Referring to FIG. 3A, a rotating drum 36 is installed on the upper chassis 30, while a supply reel 48 and a take-up reel 49 are installed on the horizontally movable slider 40. The supply reel 48 is provided with a gear 48a on the lower portion thereof, and the gear 48a is selectively meshed with a below-mentioned gear of the tape recovering means, so that a magnetic tape 24 loosened by the rotating drum 36 can be recovered.

The slider 40 advances forwardly towards the rotating drum 36 of the upper chassis 30 by a moving mechanism (not shown). Then the slider 40 is coupled with the upper chassis 30 at the position of FIG. 3B, i.e., at a first position where the magnetic tape 24 is loosened by the rotating drum 36 by a certain length. Further, during the ejecting of a tape cassette 20, the slider 40 backs away from the first position to a second position by a moving mechanism (not shown), at which the tape cassette 20 can be ejected, i.e., to the position of FIG. 3A. Accordingly, the slider 40 moves from the second position to the first position during the loading of the cassette, while the slider 40 moves from the first position to the second position during the unloading of the cassette.

The tape recovering means is pivotally installed under the slider 40 in such a manner that, in a state with the magnetic tape 24 contacted with the rotating drum 36 as shown in FIG. 3B, when the tape cassette 20 is unloaded by being withdrawn as shown in FIG. 3A, the supply reel 48 is rotated counterclockwise, thereby recovering the tape 24 loosened by the rotating drum 36.

This tape recovering means is guided by being meshed with a rack 100 fixed on the upper chassis 30. This tape recovering means includes a gear 110 fixed in such a manner that one end of its shaft 110a is rotatably secured, while the gear 110 revolves by being meshed with the rack 100.

Further, the tape recovering means includes a gear 120 meshed with the gear 110, and a gear 130. The gear 130 is meshed with a gear 120, and, when the slider 40 moves from the first position to the second position, the gear 30 is meshed with the gear 48a of the supply reel 48. Thus the supply wheel 48 is rotated counterclockwise, so that the loosened magnetic tape 24 should be wound on the supply reel hub of the tape cassette by the supply reel 48.

The shafts of the gears 110, 120 and 130 are connected to a pivoting member 140, and thus, the gears 110, 120 and 130 can pivot around the shaft 110a of the gear 110. One end of the pivoting member 140 is firmly secured on the shaft 110a of the gear 110, and therefore, the pivoting member 140 can pivot around the shaft 110a during the revolution of the gear 110.

Figure 4:
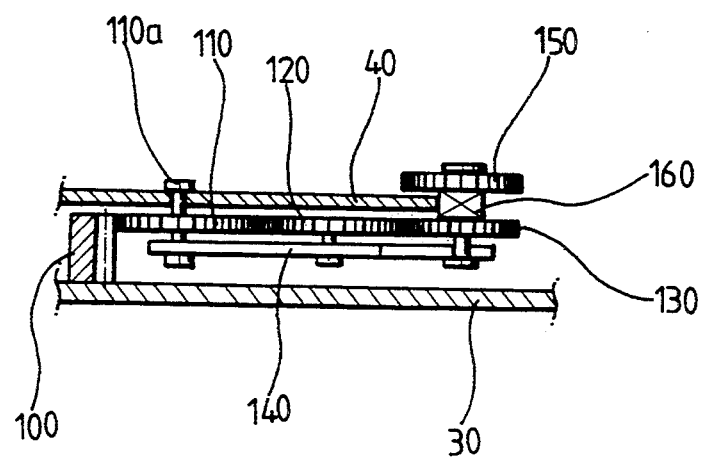
FIG. 4 is a sectional view of the tape recovering means taken along the line IV—IV.

As shown in FIG. 4 in a sectional view, the gears 110, 120 and 130 and the pivoting member 140 are all positioned under the slider 40. The gear 110 is meshed with the rack 100 all the time, and, when the slider 40 advances horizontally forwardly toward the rotating drum 36, the gear 130 is not meshed with the gear 48a of the supply reel 48 as described hereinafter. However, when the slider 40 moves horizontally backwardly from the rotating drum 36, the gear 130 is meshed with the gear 48a of the supply reel 48 to rotate the supply reel 48 counterclockwise.

Meanwhile, the amount of the tape wound on the tape supply hub (not shown by reference symbol) is not always constant, and therefore, the radius of the remaining tape roll is not constant.

Accordingly, if the remaining tape roll is the maximum, the recovered tape amount tends to be larger, and therefore, the tape is subjected to a forced tension to extend the tape.

Therefore, as shown in FIG. 4, a separate gear 150 is installed beside the gear 130, and a felt 160 as a slip generating means is installed between the gears 130 and 150, so that the rotating power from the gear 130 should be absorbed, and that a proper torque should be maintained on the gear 150 all the time.

The first embodiment of the present invention as above will now be described as to its operations.

First, as shown in FIG. 3A, the user pushes the slider 40 toward the rotating drum 36, in a state with the tape cassette 20 placed on the slider 40. Then, the slider 40 advances toward the rotating drum 36 by the action of the relevant moving mechanism.

When the slider 40 advances toward the rotating drum 36, the gear 110 rotatably installed on the shaft 110a below the slider 40 is meshed with the rack 100 fixedly installed on the upper chassis 30, so that the gear 110 should revolve counterclockwise. When the gear 110 revolves counterclockwise together with the movement of the slider 40, the pivoting member 140 having one end secured to the gear shaft 110a is pivoted with the gears 120 and 130.

In other words, when the gear 110 revolves counterclockwise, the pivoting member 140 is also pivoted counterclockwise. Then the gears 120 and 130, of which the shafts are rotatably secured on the pivoting member 140, are also rotated in such a manner that the gear 120 revolves clockwise in mesh with the gear 110 and the gear 130 revolves counterclockwise in mesh with the gear 120.

Thus, when the slider 40 moves toward the rotating drum 36, the rack 100 fixedly secured on the upper chassis 30 is meshed with the gear 110 rotatably installed under the slider 40, so that the gear 110 should revolve counterclockwise. Accordingly, the pivoting member 140 pivots counterclockwise, so that the gear 130 should not be contacted with the supply reel 48.

When the slider 40 moves from the second position of FIG. 3A to the first position of FIG. 3B, the tape recovering means does not contact with the supply reel 48 at all. If the slider 40 moves slightly more toward the upper chassis 30, the tape hub properly responds to the tape force generated when the tape 24 is wound on the rotating drum 36. Thus the tape hub revolves counterclockwise in the automatically loosening direction.

Therefore, when the slider 40 completes its horizontal movement relative to the upper chassis 30 to the first position, the loading means (not shown) is activated, so that the tape 24 can be wound around the rotating drum 36 and that the recording or reproduction of the tape can be carried out.

When the recording or reproduction is completed, the loading means unloads the portion of the magnetic tape 24 which has been wound on the rotating drum 36, and the state of FIG. 3B is maintained.

In this state, if the tape cassette 20 is to be ejected, the slider 40 is horizontally withdrawn from the upper chassis 30 by the moving mechanism (not shown). If the slider 40 withdraws under the state of FIG. 3B, the gear 110 installed under the slider 40 is meshed with the rack 100, and revolves clockwise. When the gear 110 revolves clockwise, the pivoting member 140 having one end secured on the gear shaft 110a pivots clockwise.

When the slider 40 withdraws slightly more from the first position to the second position, the gear 130 rotatably secured to the other end of the pivoting member 140 is meshed with the supply reel 48 as shown in FIG. 3A. Under this condition, when the gear 110 revolves clockwise, the gear 130 also revolves clockwise, and therefore, the supply reel 48 revolves counterclockwise.

The hub of the tape cassette 20 is coupled with the supply reel 48, and therefore, when the tape cassette 20 is positioned as in FIG. 3B, the magnetic tape 24 which has been loosened by the rotating drum 36 is wound again to the hub of the tape cassette 20 in accordance with the revolution of the supply reel 48.

Meanwhile, the length of the tape wound on the tape cassette 20 is not always constant, and therefore, the radius of the tape roll wound on the hub is not also constant.

Accordingly, the length of the tape recovered in one revolution is not constant, and therefore, the combination of the teeth of the gears of the tape recovering means should be able to sufficiently recover the loosened tape, taking into account the worst condition.

If the magnetic tape 24 is wound in the maximum amount on the hub, the tape tends to be recovered too much, and therefore, the tape is liable to be damaged by excessive tension.

Therefore, a separate gear 150 (FIG. 4) is installed coaxially with the gear 130 of the recovering means, and a felt piece 160 is installed between the gears 130 and 150. Thus the rotating power of the gear 130 is properly absorbed, and a proper torque is maintained on the gear 150 all the time, thereby making it possible to rotate the cassette hub as much as is required.

As described above, in the tape rewinding device according to the first embodiment of the present invention, the amount of the tape which is loosened by the rotating drum during the loading of the tape is recovered during the ejecting of the tape cassette, so that the entanglement of the tape to the lead or to the deck can be prevented, thereby preventing the damage to the tape.

Figure 5A:
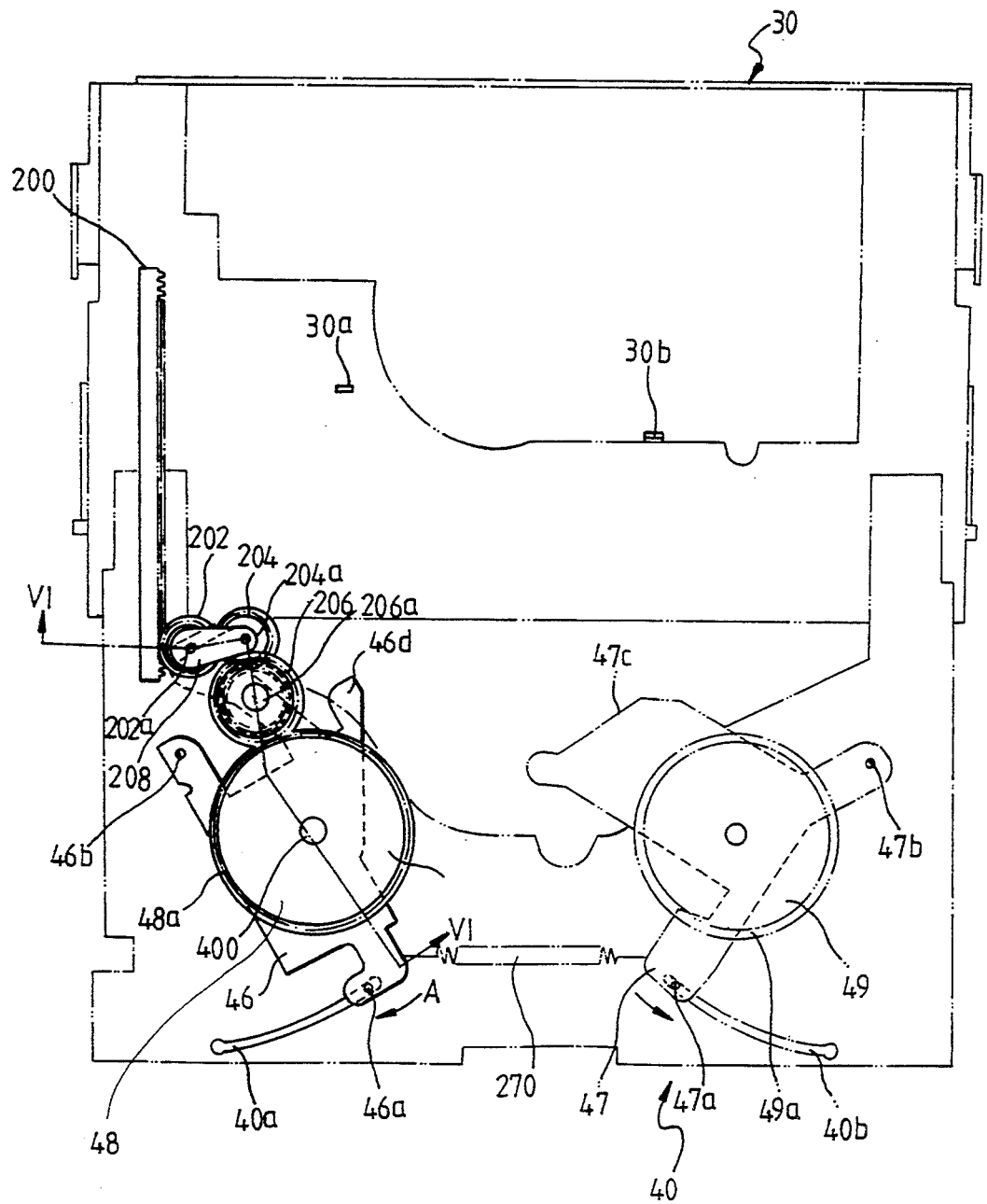
FIG. 5A is a schematic plan view of the magnetic recording and reproducing apparatus using the tape rewinding device according to the second embodiment of the present invention, in which the slider is settled on the upper chassis initially.
Figure 5B:
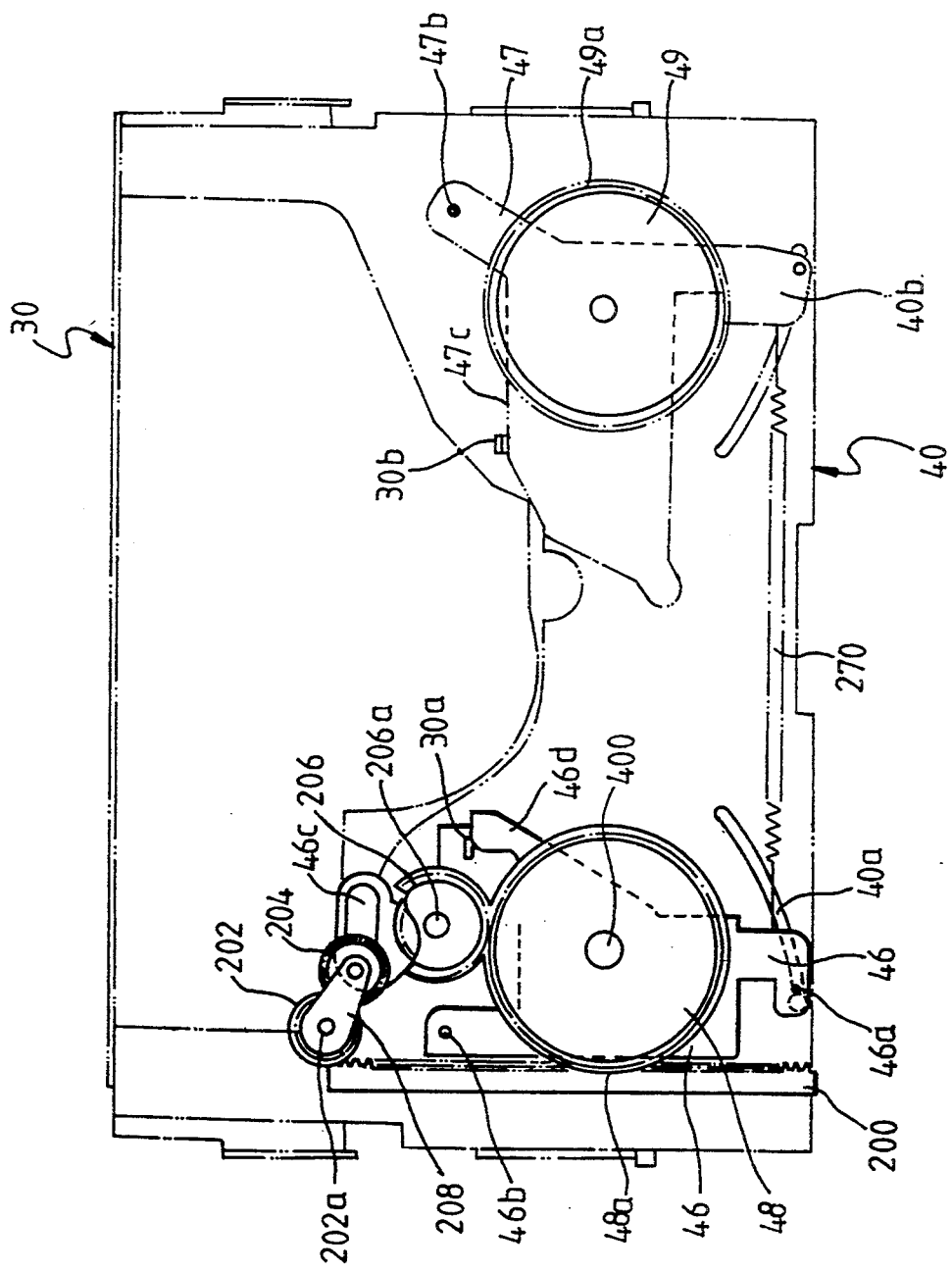
FIG. 5B is a schematic plan view of the tape recovering means showing a state in which the slider is moved horizontally forwardly toward the rotating drum under the state of FIG. 5A.
Figure 5C:
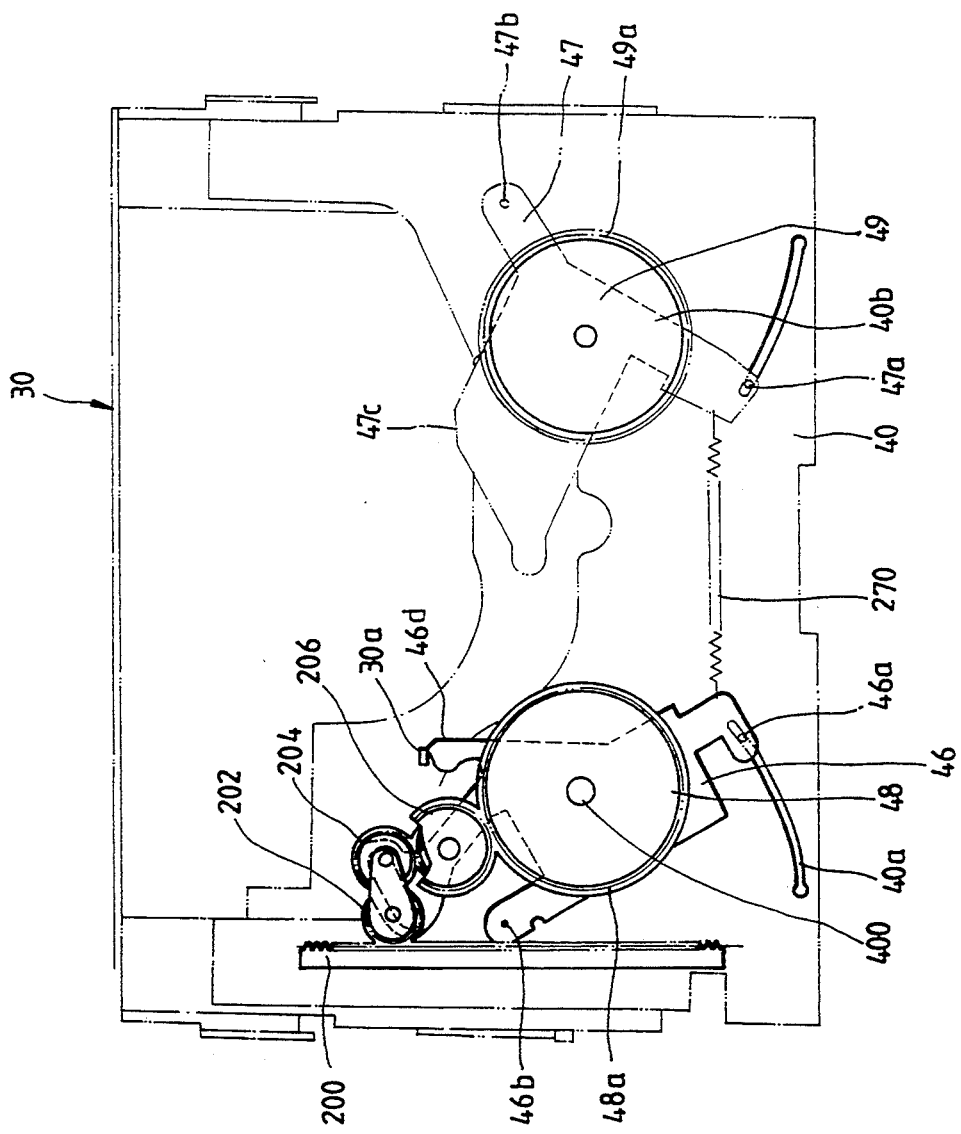
FIG. 5C is a schematic plan view of the tape recovering means showing a state in which the slider is moved horizontally backwardly from the rotating drum under the state of FIG. 5B.

FIGS. 5A to 5C illustrate a second embodiment of the present invention. The tape rewinding device according to the second embodiment is applicable to the tape recorder of FIG. 1.

Referring to FIGS. 5A to 5C, the necessarily required components of the present invention are illustrated in solid lines, while the other components are illustrated in imaginary lines.

As can be seen in the drawings, a supply reel base 46 and a take-up reel base 47 are installed under the slider 40. On the bases, there are rotatably installed reel gears 48a and 49a, so that the reel gears 48a and 49a should revolve when the reel bases 46 and 47 revolve. The reel bases 46 and 47 receive forces from a spring 270 to be elastically pivoted in the direction of the arrow mark A. That is, the reel bases 46 and 47 are provided with pins 46a and 47a. When the pins 46a and 47a pivot along elongated slots 40a and 40b, the reel bases 46 and 47 are spread around shafts 46b and 47b on the slider 40.

Meanwhile, at the other end of the reel base 46, there are installed gears 202 and 204 and a pivoting arm 208, and the gear 204 is selectively meshed with a gear 206. Shafts 202a and 204a of the gears 202 and 204 are secured by the pivoting arm 208, and the gear 204 is installed movably along an elongated slot 46c which is formed on the end portion of the reel base 46 (FIG. 5B).

The gear 206 is rotatably secured to a shaft 206a on the reel base 46, and the gear 206 is for rotatably connecting the reel gear 48a to the gear 204.

As shown in FIGS. 5A to 5C, a rack 200 which is meshed with the gear 202 is fixed-installed on the upper chassis 30. When the slider 40 horizontally moves over the upper chassis 30, the rack 200 is meshed with the gear 202, so that the reel gear 48a can be selectively rotated forwardly or reversely.

Further, stoppers 30a and 30b are installed on the upper chassis 30, and these stoppers are contacted with protuberances 46c and 47d of the reel bases 46 and 47, when the slider 40 horizontally moves toward the upper chassis 30 (FIG. 5B).

Figure 6:
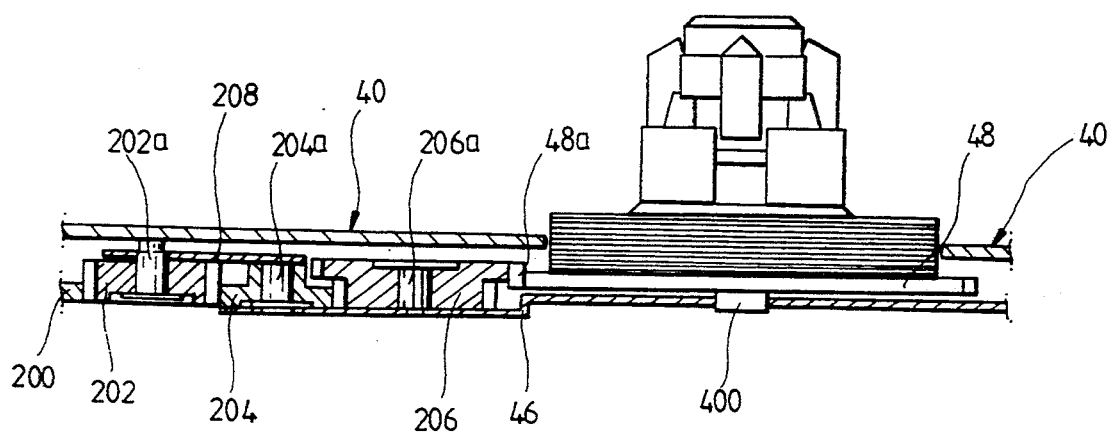
FIG. 6 is a sectional view of the tape recovering means taken along the line VI—VI.

FIG. 6 is a sectional view of the tape recovering means taken along the line VI—VI of FIG. 5A.

As can be seen in FIG. 6, the supply reel 48 is rotatably secured through a shaft 400 to the reel base 46. Further, the gears 202, 204 and 206 are meshed to each other, and these gears and the reel base 46 are installed under the slider 40.

The second embodiment of the present invention constituted as above will now be described as to its operations.

Figure 1:
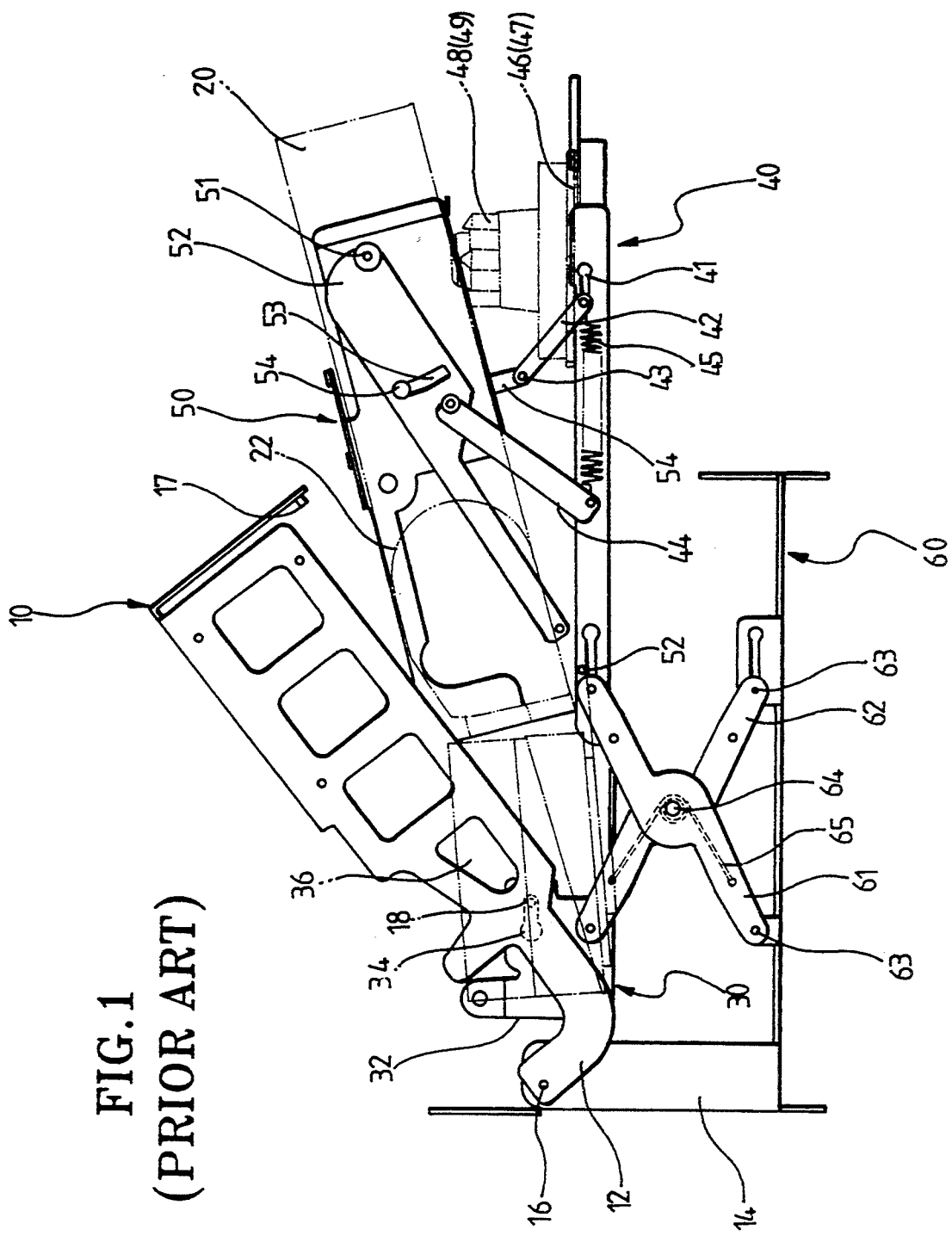
FIG. 1 is a schematic side view of a conventional magnetic recording and reproducing apparatus in which the tape rewinding device of the present invention is applicable.
Figure 2A:
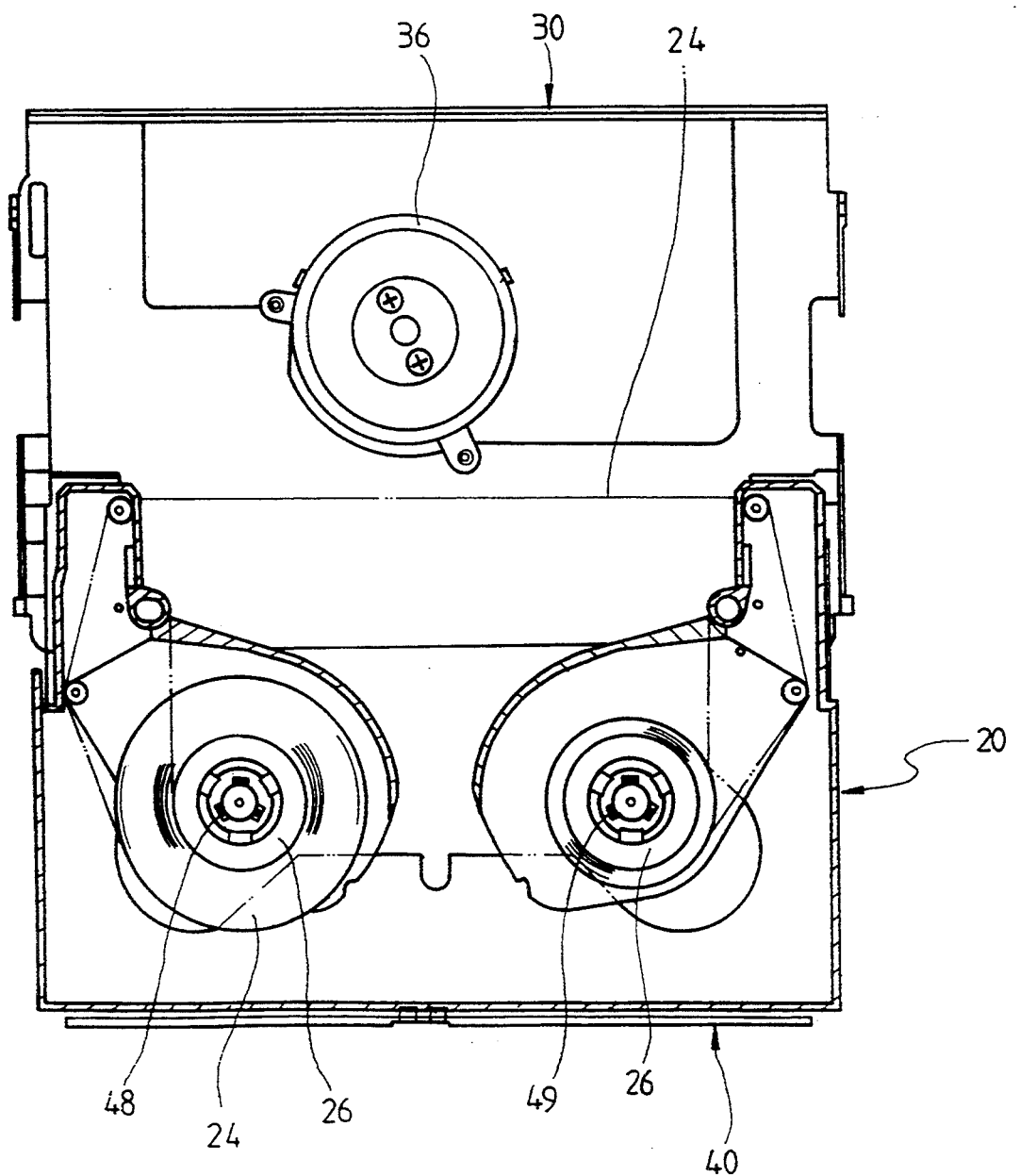
FIG. 2A is a schematic plan view showing a state in which the tape cassette is initially placed on the slider of the tape recorder of FIG. 1.
Figure 2B:
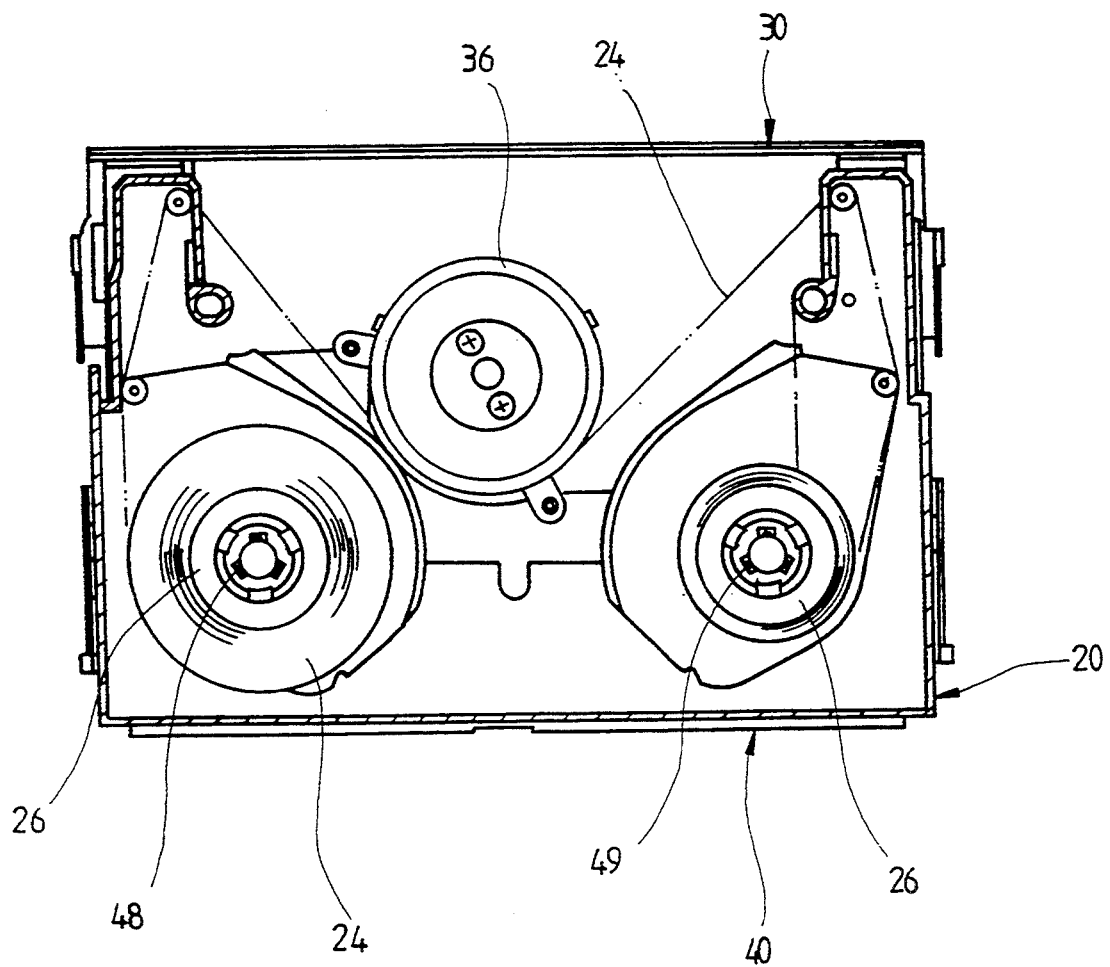
FIG. 2B is a schematic plan view showing a state in which the tape cassette is made to horizontally forwardly advance toward the rotating drum by the slider under the state of FIG. 2A.

FIG. 5A illustrates a state in which the tape cassette 20 of FIG. 1 is in a position just before moving toward the upper chassis 30 after being loaded on the cassette holder 50 and being settled on the slider 40 (FIG. 2). Here, the tape cassette is not shown for the clarity of illustration.

Thus, as shown in FIG. 2A, if the user pushes the slider 40 toward the rotating drum 36 in a state with the tape cassette loaded, a moving mechanism (not shown) horizontally moves the slider 40 toward the rotating drum 36. Under this condition, the gear 202 is meshed with the rack 200 to revolve counterclockwise. Under this condition, the gear 204 revolves clockwise, and the gear 204 and the gear 206 are not meshed with each other.

During the horizontal advancement of the slider 40, the tape is released by the rotating drum 36 which is installed on the upper chassis 30.

When the advancement of the slider 40 is completed, and when the state of FIG. 5B is brought out, the protuberances 46d and 47c of the reel bases 46 and 47 are engaged with the stoppers 30a and 30b of the upper chassis 30. Consequently, due to the advancing force of the slider 40, the reel bases 46 and 47 are pivoted around the shafts 46b and 47b in the direction of the arrow mark.

During such a pivoting operation, the gear 204 is positioned at the left side of the elongated slot 46c of the reel base 46 (FIG. 5B), and therefore, the gear 204 and the gear 206 cannot be meshed together and cannot interfere to each other. In this state, if the user pushes down the eject lever 10 (FIG. 1), the upper chassis 30 is settled on the lower chassis 60. Then loading means (not shown) is activated to load the tape onto the rotating drum 36, thereby making it possible to carry out a recording or reproduction operation.

After the completion of the recording or reproduction, if the user releases the eject lever 10 from the lower chassis 60, the upper chassis 30 rises from the lower chassis 60 by the links 61 and 62 and the elastic member 65. In this case, the tape loading means is activated to unload the tape from the rotating drum, thereby maintaining the state of FIG. 5B.

In other words, when the upper chassis 30 rises completely from the lower chassis 60, the upper chassis 30 and the slider 40 are maintained in the state of FIG. 5B.

In this state, if the slider 40 moves backwardly from the upper chassis 30, the protuberance 46d of the reel base 46 which has been engaged with the stopper 30a is released therefrom. Under this condition, the reel bases 46 and 47 are moved by the elastic force of the spring 270 in the direction of the arrow mark A. Therefore, the gears 204 and 206 are contacted together again as shown in FIG. 5B, and this time, the gears 202, 204 and 206 revolve in the directions opposite to that as above, with the result that the reel gear 48a revolves counter-clockwise.

Figure 2C:
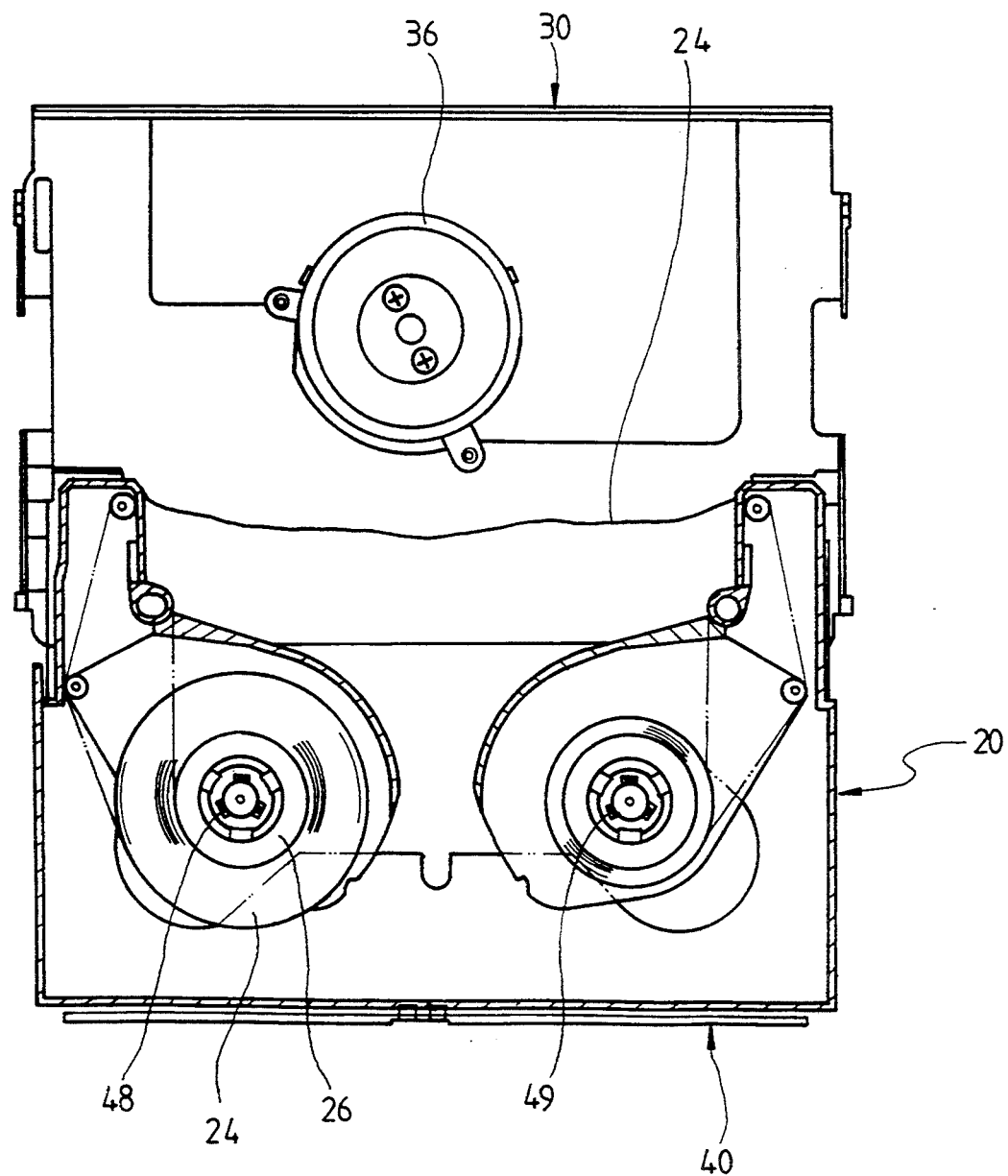
FIG. 2C is a schematic plan view showing a state in which the tape cassette is made to move horizontally backwardly from the rotating drum by the slider under the state of FIG. 2B.

When the reel gear 48a revolves counterclockwise, the tape 24 which has been loosened as shown in FIG. 2C is rewound on the hub, thereby restoring the tight state. In other words, the magnetic tape which has been loosened during the backwardly movement of the slider 40 from the state of FIG. 5C to the state of FIG. 5A is rewound on the hub, thereby recovering the loosened portion of the tape.

According to the second embodiment of the present invention, the tape cassette is provided with hubs which can be pivoted toward the opposite directions, and, during the ejecting of the tape cassette after carrying out a recording or reproduction, the loosened tape can be restored to a tight state.

According to the present invention as described above, the tape which has been loosened during the loading of the tape cassette can be recovered during the unloading of the tape cassette, thereby preventing a damage to the tape.

Although the present invention is described based on the attached drawings, those skilled in the art will understand that many kinds of modifications and additions can be made without departing from the scope of the present invention which will be limited only by the appended claims. For example, the tape rewinding device can be installed on the take-up reel instead of the supply reel.

The invention is in no way limited to the embodiment described hereinabove. Various modifications of the disclosed embodiment as well as other embodiments of the invention will become apparent to persons skilled in the art upon reference to the description of the invention. It is, therefore, contemplated that the appended claims will cover any such modifications or embodiments as fall within the true scope of the present invention.

What is claimed is:

1. A tape rewinding device for a magnetic recording and reproducing apparatus, including: a main chassis with a rotating drum installed thereon; a pair of reels for supporting a tape cassette; and a sub-chassis for sliding over said main chassis toward said rotating drum for loading or unloading said tape cassette, said tape rewinding device comprising:

a rack gear installed on said main chassis; and a tape recovering means installed on said sub-chassis, for generating a rotating force by being contacted with said rack gear during the unloading of said tape cassette by said sub-chassis, and for transmitting said rotating force to one of the pair of said reels for recovering the loosened tape portion formed near said rotating drum during the ejecting of said tape cassette.

2. The tape rewinding device as claimed in claim 1, wherein said tape recovering means consists of idler gears meshed with said rack gear, and the shafts of said idler gears are installed on said sub-chassis.

3. The tape rewinding device as claimed in claim 2, wherein said tape recovering means comprises: a first gear rotatably installed on said sub-chassis, and meshed with said rack gear; a second gear meshed with said first gear; a third gear meshed with said second gear, and meshed with said reel during the sliding of said sub-chassis for unloading said tape cassette, so as for the loosened tape portion to be wound back to said reel by rotating said reel; and a pivoting member with one end of it secured to the shaft of said first gear, so as for said first, second and third gears to be sequentially meshed.

4. The tape rewinding device as claimed in claim 3, wherein said tape recovering means further comprises a slip member installed between said third gear and a separate gear to prevent the loosening of the tape.

5. A tape rewinding device for a magnetic recording and reproducing apparatus, including: a main chassis with a rotating drum installed thereon; and a sub-chassis with a pair of reels installed thereon for loading a tape cassette, and for sliding over said main chassis toward said rotating drum to load or unload said tape cassette, said tape rewinding device comprising:

a rack gear installed on said main chassis;

a transmitting gear connected to one of said reels and a tape recovering means installed on said sub-chassis in meshed engagement with said rack gear for transmitting a rotating force to said transmitting gear during the unloading of said tape cassette by the movement of said sub-chassis, thereby driving said reel to recover the tape portion loosely loaded on said rotating drum.

6. The tape rewinding device as claimed in claim 5, wherein said tape recovering means comprises: idler gears for being meshed with said rack gear; and an idler position regulating means for regulating the position of said idler gears upon completion of the loading of said tape cassette by said sub-chassis to release the contact of said idler gear with said transmitting gear.

7. The tape rewinding device as claimed in claim 6, wherein said tape recovering means comprises: a transmitting gear installed on a reel base, and for being meshed with said reel; a first idler gear for being meshed with said transmitting gear to forwardly or backwardly rotate said transmitting gear during the loading or unloading of said tape cassette by said sub-chassis, and for not being meshed with said transmitting gear upon completion of the loading of said tape cassette; and a second idler gear for being meshed with said rack gear, and for being meshed with said first idler gear by a pivoting member to rotate said first idler gear.

8. The tape rewinding device as claimed in claim 7, wherein said first idler gear is regulated by said idler position regulating means in such a manner that said first idler gear is meshed with said transmitting gear only during the loading or unloading of the tape cassette by said sub-chassis, and the mesh of said first idler gear with said transmitting gear is released only upon completion of the loading of said tape cassette by said sub-chassis.

* * * * *